ELECTRONIC RING CIRCUIT COMPRISING PLURALITY OF FIRST AND SECOND SWITCHING MEANS DRIVEN BY OVERLAPPING A.C. WAVEFORMS

Filed Dec. 23, 1963 5 Sheets-Sheet 1

INVENTORS
PAUL ABRAMSON
PAO H. CHIN
BY [signature]
AGENT

July 4, 1967 P. ABRAMSON ETAL 3,329,831

ELECTRONIC RING CIRCUIT COMPRISING PLURALITY OF FIRST AND SECOND SWITCHING MEANS DRIVEN BY OVERLAPPING A.C. WAVEFORMS

Filed Dec. 23, 1963 5 Sheets-Sheet 2

July 4, 1967 P. ABRAMSON ETAL 3,329,831

ELECTRONIC RING CIRCUIT COMPRISING PLURALITY OF FIRST AND SECOND SWITCHING MEANS DRIVEN BY OVERLAPPING A.C. WAVEFORMS

Filed Dec. 23, 1963 5 Sheets-Sheet 3

July 4, 1967 P. ABRAMSON ETAL 3,329,831

ELECTRONIC RING CIRCUIT COMPRISING PLURALITY OF FIRST AND SECOND SWITCHING MEANS DRIVEN BY OVERLAPPING A.C. WAVEFORMS

Filed Dec. 23, 1963 5 Sheets-Sheet 5

United States Patent Office

3,329,831

Patented July 4, 1967

3,329,831

ELECTRONIC RING CIRCUIT COMPRISING PLURALITY OF FIRST AND SECOND SWITCHING MEANS DRIVEN BY OVERLAPPING A.C. WAVEFORMS

Paul Abramson, Yorktown Heights, and Pao H. Chin, Pleasantville, N.Y., assignors to International Business Machines Corporation, New York, N.Y., a corporation of New York Filed Dec. 23, 1963, Ser. No. 332,597
12 Claims. (Cl. 307—88.5)

This invention relates to electronic ring circuits, and more particularly to an electronic ring circuit which is synchronized with an alternate current (A-C) power supply, the A-C power supply being the only source of power required.

Many electronic circuits and applications require repeated cycles of timing or clocking pulses to function properly. In most cases, the required sequence of pulses is obtained by rotating or otherwise moving a mechanical contact arm over a sequence of spaced contacts, the desired output pulses being tapped off from these contacts. Such devices are subject to wear and tear and therefore require continuous maintenance. Another disadvantage of such devices is that their accuracy is limited by such factors as dirt getting on the contacts, bearing wear and line change varying the path and the frequency of the rotating arm respectively, and the pulse nature of the prime mover, generally a motor, giving asynchronous operation (i.e., flutter). The relatively high power requirement of the motor required to drive the rotating arm also cause such devices to have high operating costs and the size of the motor generally causes these devices to be relatively large.

To overcome the above difficulties, various electronic ring circuits have been developed. Such devices have, however, required two power supplies; a D-C power supply to bias the various electronic components and a source of pulses to step the ring. This arrangement has increased the complexity of the circuits, making the circuits more expensive to build and operate.

It is therefore the primary object of this invention to provide an improved electronic ring circuit.

A more specific object of this invention is to provide an electronic commutator device, having high reliability and low operation cost.

Another object of this invention is to provide an electronic commutator which operates synchronously with an A-C power supply, the A-C power supply being the only source of power required.

A further object of this invention is to provide a relatively simple, compact, low-powered electronic commutator.

In accordance with these objects, this invention provides a plurality of switching devices. These devices may, for example, be relays or transistors. A first line is connected to alternate ones of the switching devices and a second line to the remaining ones of the switching devices. An incoming A-C wave is converted into two trains of wave shapes, the duration and relative frequency of the wave shapes being such that each wave shape in the first train begins just before the preceding wave shape in the second train ends and each wave shape in the second train begins just before each wave shape in the first train ends. There is therefore a time overlap between succeeding wave shapes in the two trains. The first train of wave shapes is applied to the first line and the second train of wave shapes to the second line. The switching devices are electrically connected in a closed ring and are interconnected in a manner such that a wave shape of the first train passing through a switching device connected to the first line conditions the succeeding switching device connected to the second line to pass the next wave shape on the second line, and, conversely, a wave shape from the second train passing through a switching device connected to the second line conditions the succeeding switching device connected to the first line to pass the next wave shape applied to the first line. A starting device is provided for getting the ring going. To reduce the total number of components required, the output pulses from a first smaller ring may be used as the input wave shapes to a second larger ring.

The foregoing and other objects, features and advantages of the invention will be apparent from the following more particular description of preferred embodiments of the invention, as illustrated in the accompanying drawings.

Figure 1:
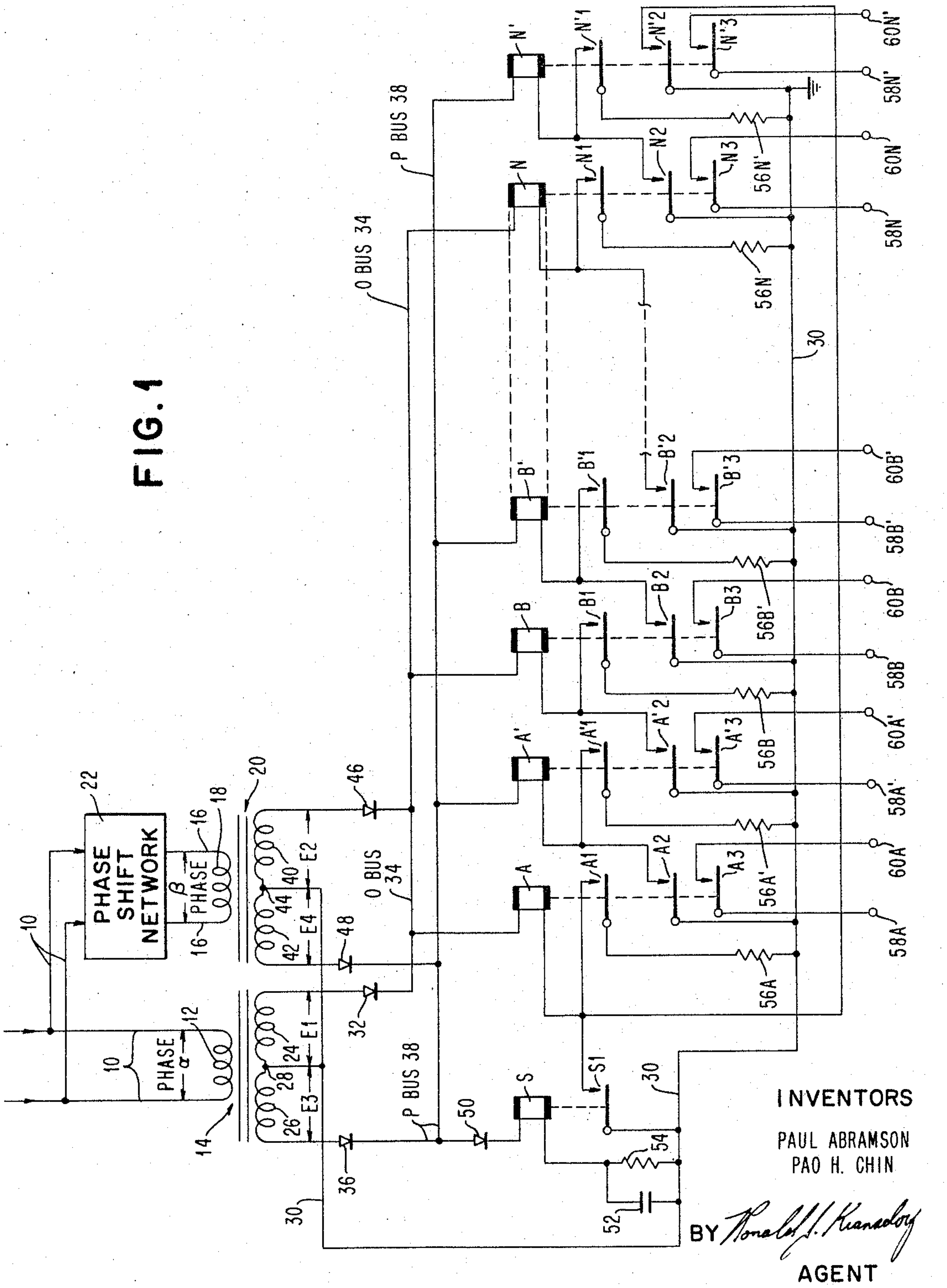
FIG. 1 is a schematic diagram of a relay embodiment of the invention.

*Circuit description of FIG. 1*

Referring to FIG. 1, it is seen that an A-C signal having a phase $\alpha$ is applied through lines 10 to primary winding 12 of transformer 14. An A-C signal having a phase $\beta$ is applied through lines 16 to primary winding 18 of transformer 20. As may be seen from line *a* of FIG. 3, phase $\alpha$ leads phase $\beta$ by 60°. The phase $\beta$ signal may be obtained, as shown in FIG. 1, by passing the phase $\alpha$ signal on line 10 through passive phase-shift network 22 to line 16 or, where a polyphase A-C power supply is available, phases $\alpha$ and $\beta$ may be derived from two of the three phases of the power supply.

Transformer 14 has two secondary windings, 24 and 26. The common terminal 28 of these windings is connected to ground line 30. The other end of winding 24 is connected through diode 32 to O bus 34. The other end of winding 26 is connected through diode 36 to P bus 38. The transformer 20 has two secondary windings 40 and 42. Common point 44 of these windings is connected to ground line 30. The other end of winding 40 is connected through diode 46 to O bus 34. The other end of winding 42 is connected through diode 48 to P bus 38. Potentials E1, E3, E2, and E4 are developed across transformer secondary windings 24, 26, 40 and 42, respectively.

Figure 3:
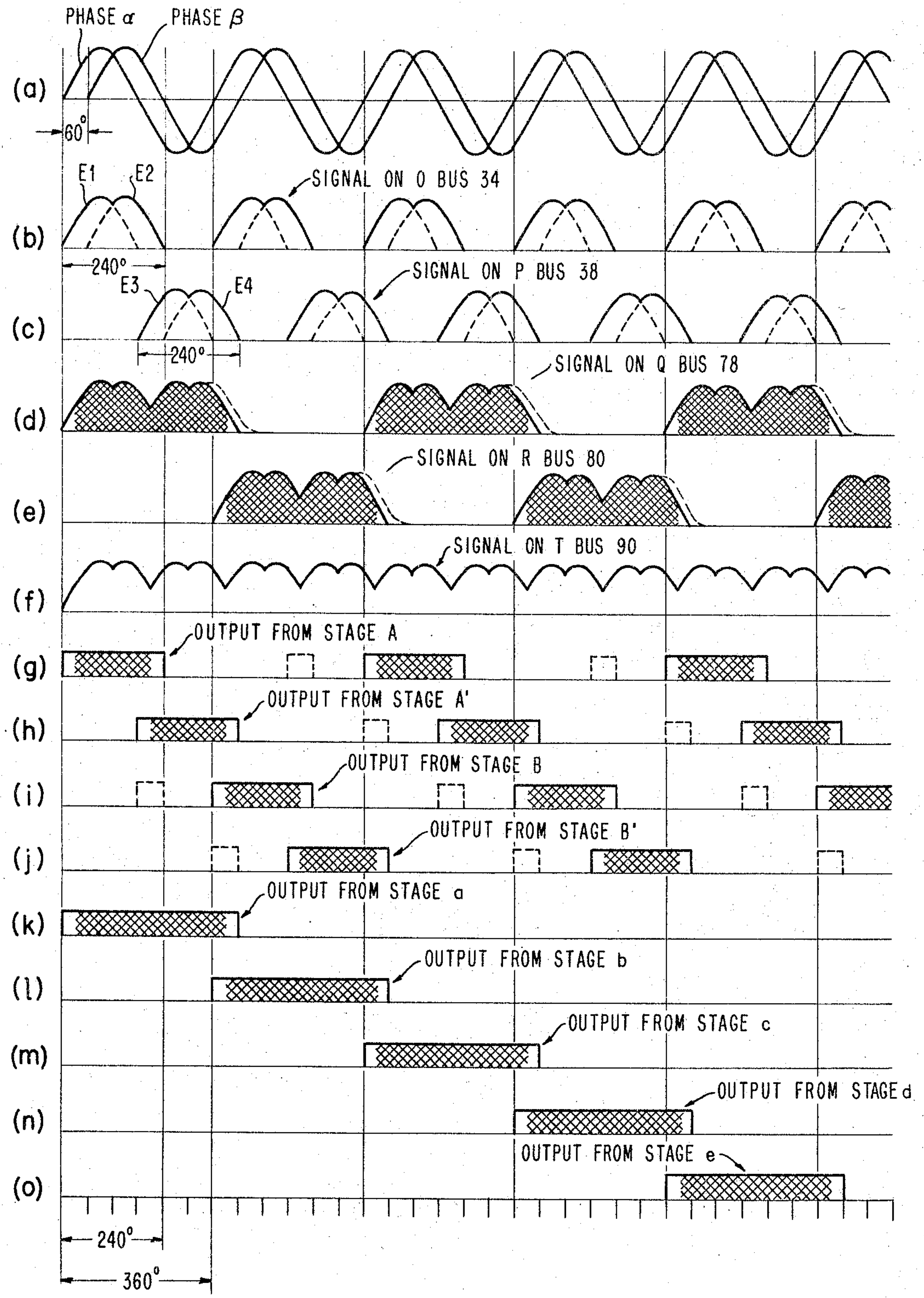
FIG. 3 is a timing chart used to illustrate the operation of the various embodiments of the invention.

Referring to line *b* of FIG. 3, it is seen that this arrangement gives a signal (E1+E2) which lasts for 240° on O bus 34. Referring to line *c* of FIG. 3, it is seen that the effect of transformer secondaries 26 and 42 is to invert the negative portions of the phase $\alpha$ and phase $\beta$ signals and to rectify them, giving a positive signal (E3+E4) on P bus 38, which likewise lasts for 240°. Referring to lines *b* and *c* of FIG. 3 together, it is seen that there is a 60° overlap between the end of a signal on O bus 34 and the beginning of the next signal on P bus 38 and likewise, there is a 60° overlap between the end of a signal on P bus 38 and the beginning of the next signal on O bus 34.

O bus 34 is connected to one end of each alternate relay coil in the circuit. These coils are designated, A, B . . . N. P bus 38 is connected through diode 50 to one end of start coil S and to one end of the alternate relay coils not connected to O bus 34. The coils connected to P bus 38 are designated A′, B′ . . . N′. The other end of start coil S is connected through a parallel network comprising capacitor 52 and resistor 54 to ground line 30. The other end of coil A is connected to one terminal of normally-open contact S1 of relay coil S, to one terminal of normally-open contact N'2 of relay N', and to one terminal of normally-open contact A1 of relay A. The other terminal of each of these normally-open contacts is connected to ground line 30, the other terminal of contact A1 being connected to ground line 30 through resistor 56A.

The other end of coil A' is connected to one terminal of contact A2 of relay A and one terminal of contact A'1 of relay A'. The other terminal of contact A2 is connected directly to ground line 30 and the other terminal at contact A'1 is connected through resistor 56A' to ground line 30. The other end of each coil B . . . N is connected to one terminal of the second contact for the preceding prime (') lettered relay and to one terminal of the first of its own contacts. The other terminal of the second contact of the prime relays is connected directly to ground line 30 while the other terminal of its own first contact is connected through a resistor 56 to ground line 30. Similarly, the other end of each of the relay coils B' . . . N' is connected to one terminal of the second contact for the preceding relay B . . . N, respectively, and to one terminal of the first of its own contacts. The other terminal for the second contact of the preceding relay is connected directly to ground line 30 while the other terminal of its own first contact is connected through a resistor 56 to ground line 30. Whenever current is flowing through a given one of the relay coils A . . . N or A' . . . N', the third contact (A3 . . . N3 or A'3 . . . N'3, respectively) of that relay is closed, forming a closed circuit between output terminals 58A . . . 58N or 58A' . . . 58N' and 60A . . . 60N or 60A' . . . 60N', respectively.

*Operation of the circuit of FIG. 1*

To operate the circuit of FIG. 1, an A-C signal of phase $\alpha$ is applied to lines 10. This signal is applied to primary winding 12 of transformer 14. This signal is also shifted 60° in passive phase-shift network 22 and applied through lines 16 as a phase $\beta$ signal to primary winding 18 of transformer 20. The resulting E1 and E2 signals induced in secondary windings 24 and 40, respectively, are combined to form the signal shown on line *b* of FIG. 3, and applied to O bus 34. The inverted signals E3 and E4 induced in a secondary windings 26 and 42, respectively, are combined to form the signal shown on line *c* of FIG. 3 and applied to P bus 38.

Since all contacts in the circuit are initially open, the first signal applied to O bus 34 finds no complete circuit and is ineffective to cause an output signal. The signal applied to P bus 38 180° later is passed through diode 50, relay coil S and resistor 54 to ground. This results in relay coil S being energized and allows capacitor 52 to be charged. The current passing through relay coil S causes contact S1 of this relay to be closed.

Since there is a 60° overlap between the beginning of the second pulse on O bus 34 and the end of the first pulse on P bus 38, coil S is still energized and contact S1 still closed, when the second pulse on O bus 34 begins. This pulse therefore passes through relay coil A and now closed contact S1 to ground line 30. Coil A is therefore energized, causing contacts A1, A2 and A3 to be closed. The closing of contact A1 allows coil A to remain energized through its own contact after contact S1 opens due to the termination of the first pulse on P bus 38. The closing of contact A3 allows an output to be obtained from the circuit through terminals 58A and 60A. More contacts may be provided on relay A if additional outputs are desired.

Since there is also a 60° overlap between the beginning of the second pulse on P bus 38 and the end of the second pulse on O bus 34, when the second pulse is applied to P bus 38 relay coil A is still energized. Contact A2 is therefore closed at this time, allowing the pulse on P bus 38 to be applied through relay coil A' and now closed contact A2 to ground line 30. Relay coil A' is in this manner energized, causing contacts A'1, A'2, and A'3 to be closed. Therefore, when the second pulse terminates on O bus 34, relay coil A' remains energized through its own contacts A'1.

The signal on P bus 38 is also applied through diode 50 to start coil S. However, the charge now on capacitor 52 prevents a sufficient potential difference from being developed across coil S to cause contact S1 to be closed. Therefore, the only closed path to ground for the next pulse applied to O bus 34 is through relay coil B and contact A'2 of relay A'. The remaining coils in the circuit of FIG. 1 are energized in sequence in a manner identical to that described above for the first three coils. Since contact N'2 for relay N' is connected in series with relay coil A, the circuit is a ring circuit which continues to operate until power is removed from lines 10. As soon as power is returned to lines 10, the circuit resumes operation in the manner previously described.

As indicated previously, when a given relay coil is energized, its third contact is closed providing a closed circuit between its terminals 58 and 60. If it is assumed that there are only four relays in the chain so that contact N'2 is actually the contact B'2, then the cross-hatched portions of the pulses on lines *g, h, i* and *j* of FIG. 3 represent the outputs obtainable through terminals 58A–60A, 58'A–60A', 58B–60B, and 58B'–60B', respectively. Since the relays pick only when the voltage across them exceeds a predetermined threshold, and the relays drop out when the voltage across them drops below a predetermined threshold, the output signals obtainable through terminals 58–60 have a shorter duration than the duration of the pulses applied to the relay coils, these pulses being represented by the entire pulses shown on lines *g, h, i* and *j* of FIG. 3.

Figure 2:
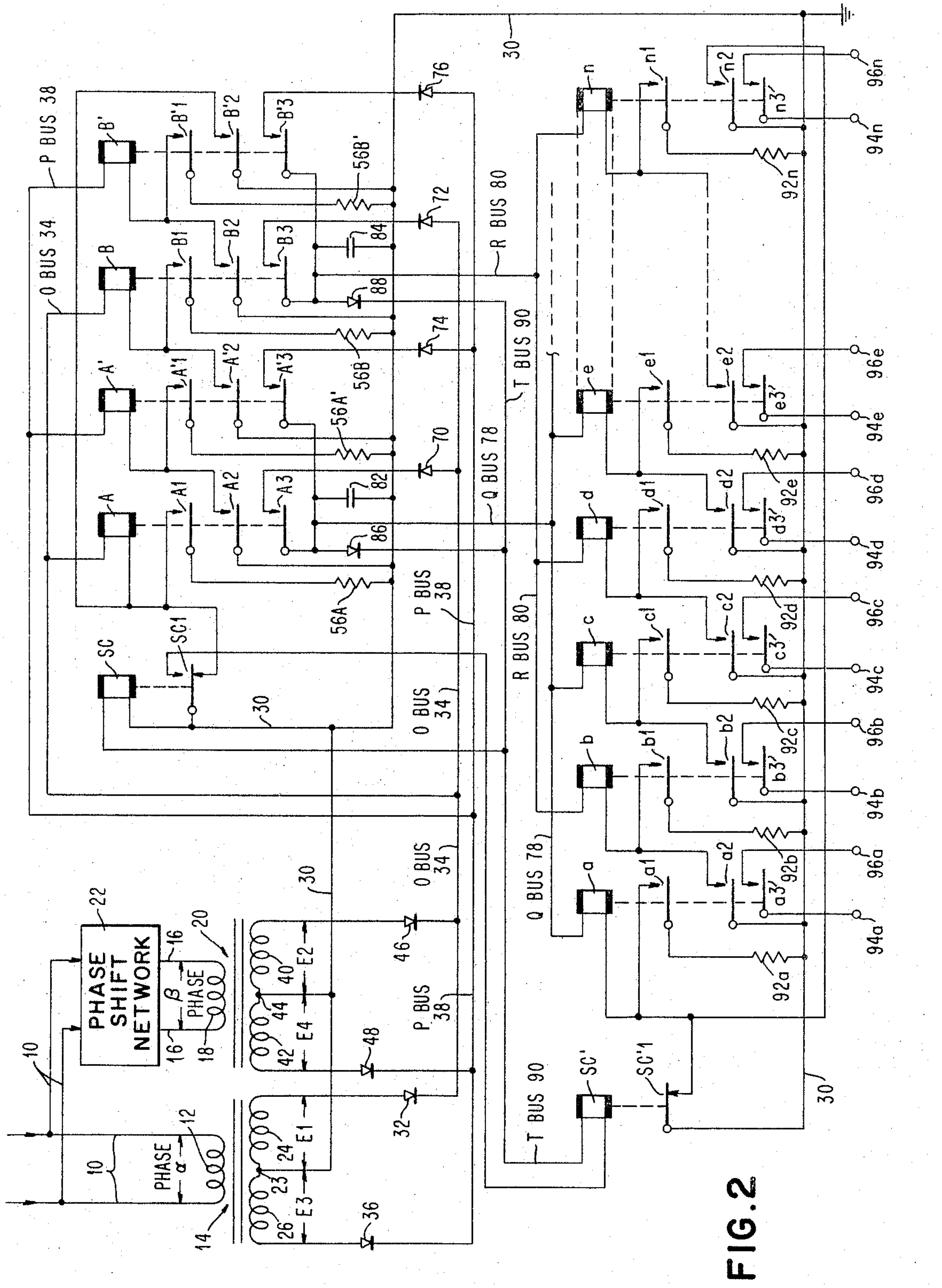
FIG. 2 is a schematic diagram of an alternative relay embodiment of the invention.

Referring to FIG. 3, it is also seen that with the circuit shown in FIG. 1, two relays are required for each 360° cycle of the A-C power supply. Where the commutator is to supply a large number of timing pulses, this could result in the use of a large number of relays. FIG. 2 shows a scheme for reducing the number of relays required to generate the desired timing pulses where a large number of timing pulses are required.

*General description of FIG. 2*

Referring now to the upper-left portion of FIG. 2, it is seen that it includes the same circuitry shown in FIG. 1 to convert a phase $\alpha$, A-C signal on line 10 into the wave shape shown on line *b* of FIG. 3 on O bus 34 and the wave shape shown on line *c* of FIG. 3 on P bus 38. The same reference numerals have been used to designate like elements in FIGS. 1 and 2.

O bus 34 is connected to one end of relay coil A, to one end of relay coil B, through diode 70 to one terminal of contact A3 of relay A, and through diode 72 to one terminal of contact B3 of relay B. P bus 38 is connected to one end of relay coil A', to one end of relay coil B', through diode 74 to one terminal of contact A'3 of relay A', and through diode 76 to one terminal of contact B'3 of relay B'. The other end of relay coils A, A', B and B' are connected to ground line 30 through parallel contact networks which are the same as those shown in FIG. 1, the only difference being that the normally-closed terminal of transfer contact SC1 is substituted for the normally-open contact S1 in FIG. 1 in the circuit for relay A. The reason for this difference will be described later.

The other terminal of contacts A3 and A'3 are connected to form Q bus 78. The other terminal of contacts B3 and B'3 are connected to form R bus 80. Q bus 78 is connected through capacitor 82 to common line 30 and R bus 80 is connected through capacitor 84 to the common line. Q bus 78 and R bus 80 are connected through diodes 86 and 88, respectively, to T bus 90. T bus 90 is connected to one end of start coil SC and to one end of start coil SC'. The other end of start coil SC is connected directly to ground line 30. The other end of coil SC' is connected to the normally-open terminal of transfer contact SC1. The moving arm of this contact is connected to ground line 30. The normally-closed terminal of contact SC1 is connected to one end of relay coil A.

Q bus 78 is also connected to one end of relay coil *a*, relay coil *c*, relay coil *e*, and to each alternate relay coil in the lower-case-letter chain thereafter. R bus 80 is connected to one end of relay coil *b*, relay coil *d*, and each alternate relay coil thereafter in the lower-case-letter relay chain, including the last relay coil *n* in the chain. The other end of coil *a* is connected to ground line 30 through a parallel network, the three legs of which are (1) normally-closed contact SC'1 of start relay SC'; (2) normally-open contact *n*2 of relay *n*; (3) normally-open contact *a*1 and current limiting resistor 92*a*. The other end of each of the coils *b*–*n* are connected to ground through a parallel network, the two legs of which are (a) the normally-open contact *a*2-(*n*−1)2, respectively, for the preceding relay in the chain and (b) the normally-open contact *b*1–*n*1, respectively, for the relay and associated current limiting resistor 92*b*–92*n*. The circuit provides a closed circuit through terminals 94 and 96 for a given relay when current is flowing through the coil of the relay causing its third contact to close.

*Operation of circuit of FIG. 2*

As with the circuit shown in FIG. 1, a phase $\alpha$ wave applied to line 10 is converted into a phase $\beta$ wave in passive phase-shift network 22. The phase $\alpha$ and phase $\beta$ signals are then converted by transformers 14 and 20 into the pulse train shown on line *b* of FIG. 3 which is applied to O bus 34 and the pulse train shown on line *c* of FIG. 3, which is applied to P bus 38. The first pulse applied to O bus 34 finds a complete circuit to ground line 30 through the coil of relay A and the normally-closed terminal of contact SC1. The signal applied to the coil of relay A causes contacts A1, A2, and A3 to be closed. The closing of contact A3 allows the signal on O bus 34 to be applied through diode 70, and now closed contact A3 to Q bus 78. The signal on Q bus 78 is applied through diode 86 to T bus 90. The signal on T bus 90 is applied through start coil SC to ground line 30. The signal passing through start coil SC1 causes start contact SC1 to transfer.

At the same time that the above operations are occurring, the signal on Q bus 78 is also being applied through relay coil *a* and normally-closed contact SC'1 to ground line 30. The energizing of coil *a* causes contacts *a*1, *a*2 and *a*3 of this relay to be closed.

Contacts *a*1–*a*3 close and contact SC1 transfers at about the same time. The transferring of contact SC1 allows the signal on T bus 90 to pass through coil SC' and the now-closed terminal of contact SC1 to ground line 30. This causes start coil SC' to be energized, thereby opening normally-closed contact SC'1. Since, as can be seen from line *f* of FIG. 3, there is a continuous signal on T bus 90 as long as energy is applied to lines 10, start coils SC and SC' remain energized, and start contacts SC1 and SC'1 therefore remain transferred and open, respectively. The start circuit for the circuit of FIG. 2 is therefore deactivated until power is removed from line 10, at which time contacts SC1 and SC'1 are returned to their normal condition to prepare the circuit to resume operation on the resumption of power on lines 10.

Due to the 60° overlap between the beginning of the first pulse on P bus 38 and the end of the first pulse on O bus 34, contact A2 is still closed when the first pulse appears on P bus 38, allowing this pulse to pass through coil A' and now closed contact A2 to ground line 30. The energizing of coil A' causes contacts A'1, A'2, and A'3 to be closed. The closing of contact A'3 allows the signal on P bus 38 to pass through diode 74 and now closed contact A'3 to Q bus 78. The duration of the signal on Q bus 78 is therefore equal to the combined duration of the signal on O bus 34 and P bus 38. Therefore, referring to lines *g*, *h*, and *k* of FIG. 3, it is seen that, theoretically, coil *a* remains energized during the period that coils A and A' are energized.

Similarly, the second pulse on O bus 34 is passed through relay coil B and now closed contact A'2 to ground line 30 and the second pulse on P bus 38 is passed through relay coil B' and now closed contact B2 to ground line 30. The energizing of coil B causes contact B3 to be closed, allowing the signal on O bus 34 to be passed through diode 72 and now closed contact B3 to R bus 80. Similarly, the energizing of relay coil B' closes contact B'3 allowing the pulse on P bus 38 to pass through diode 76 and now closed contact B'3 to R bus 80. Therefore, there is also a pulse on R bus 80 for the duration of a pulse on O bus 34 and a pulse on P bus 38. The first pulse on R bus 80 is applied through the coil of relay *b* and now closed contact *a*2 to ground line 30. This means that, theoretically, relay *b* is energized for the duration of relays B and B'.

While the conditions indicated above are theoretically true, as a practical matter, contact A3 closes a short time after a signal is applied to O bus 34 and contact A'3 opens a short time before a signal terminates on P bus 38. Therefore, the actual pulse on Q bus 78, the part of the pulse which is cross-hatched, is somewhat shorter than the theoretical pulse. For the same reason, the pulse on R bus 80 is somewhat shorter than the theoretical pulse on this line. As can be seen from lines *d* and *e* of FIG. 3, instead of a 60° overlap between the pulses on Q bus 78 and R bus 80 which occurs for the theoretical pulses, there is little if any overlap for the actual pulses. Since some overlap between the pulses on Q bus 78 and R bus 80 in necessary in order for the relay chain *a*–*n* to operate, capacitors 82 and 84 are connected across Q bus 78 and R bus 80, respectively, in order to stretch the pulses on these lines as indicated by the dotted portion of the pulses on lines *d* and *e* of FIG. 3. This provides the required overlap.

The next pulse on O bus 34 finds a complete circuit to ground through relay coil A and now closed contact B'2. The resulting closure of contact A3 allows the signal on O bus 34 to pass through diode 70 and now closed contact A3 to Q bus 78. The signal on Q bus 78 is passed through relay coil *c* and now closed contact *b*2 to ground line 30.

The relay chain made up of relays A, A', B, B' therefore operates to supply the double-length pulses on Q bus 78 and R bus 80 which pulses are applied to relay chain *a*–*n*. As these relays are energized in succession, the required timing pulses are obtainable through the closed circuits formed between output terminals 94*a*–94*n* and 96*a*–96*n*.

Figure 4:
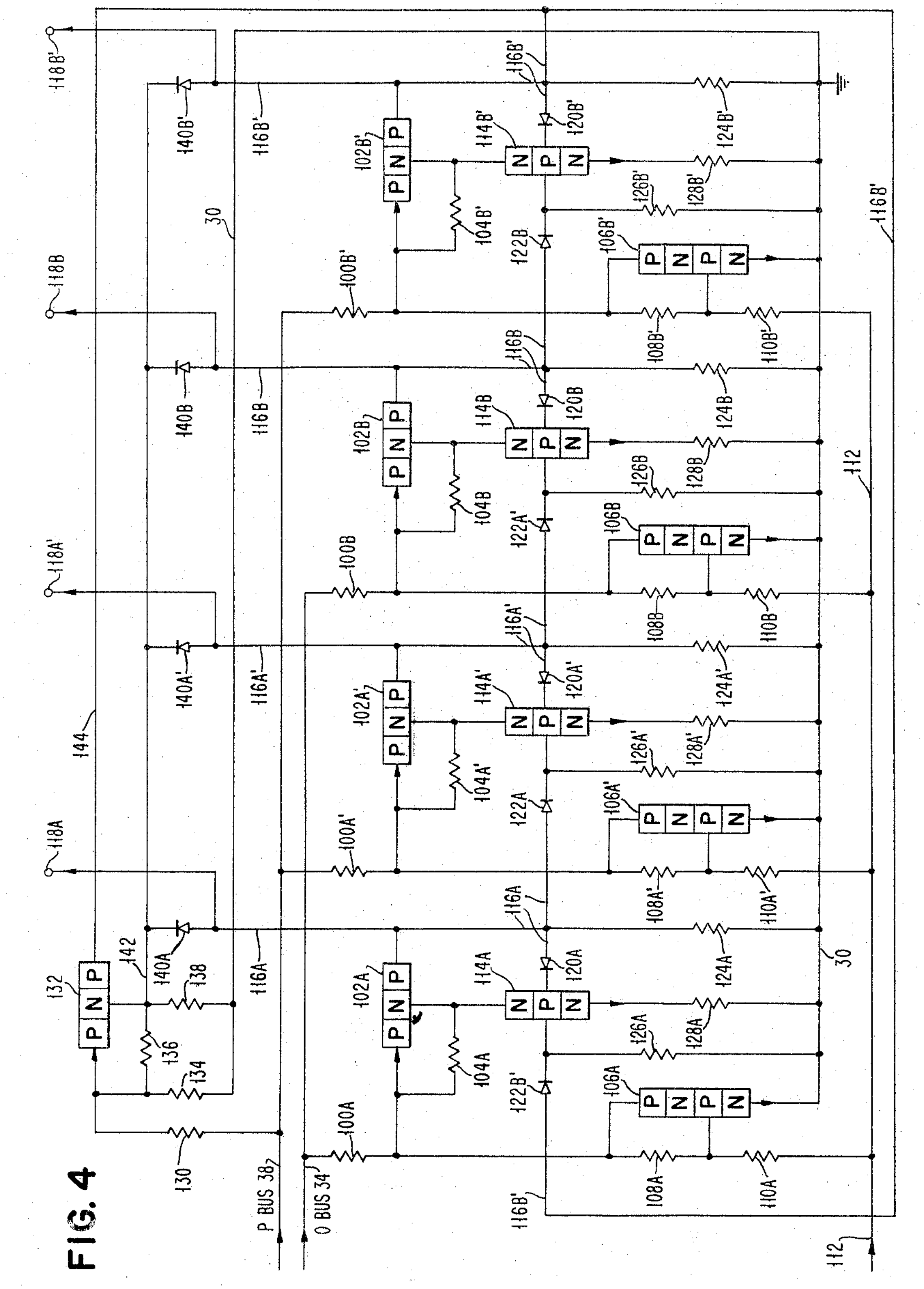
FIG. 4 is a schematic diagram of a transistor embodiment of the invention.

*General description of FIG. 4*

FIG. 4 shows a transistorized embodiment of the circuit of this invention. While in FIG. 4 the circuitry for generating the signals on O bus 34 and P bus 38 is not shown, this circuitry is identical to that shown in FIGS. 1 and 2. O bus 34 is connected through resistances 100A and 100B to the emitters of PNP transistors 102A and 102B, respectively. The emitters of transistors 102A and 102B are connected to the bases of these transistors through resistances 104A and 104B, respectively. The emitters of transistors 102A and 102B are also connected directly to the external P electrodes, the anodes, of PNPN thyratron transistors 106A and 106B and through resistances 108A and 108B, respectively, to the internal P electrode, the control electrode of these thyratron transistors. The internal P electrodes of thyratron transistors 106A and 106B are connected through resistors 110A and 110B to line 112. The signal on line 112 is obtained by combining the signals on O bus 34 and P bus 38 and inverting them. The result is a signal like the one shown on line *f* of FIG. 3, except that it is negative rather than positive. The external N electrodes, the cathodes, of thyratron transistors 106A and 106B are connected to ground line 30. The thyratron transistors have the property that they fire, becoming fully conductive, as soon as the potential applied to the internal P electrode becomes more positive than the potential applied to the external N electrode, and that once they are fired, they remain fired until the anode potential, the potential applied to the external P electrode drops below a predetermined threshold.

P bus 38 is connected through resistors 100A′ and 100B′ to the emitters of transistors 102A′ and 102B′, respectively. The emitters of transistors 102A′ and 102B′ are connected to their respective bases through resistors 104A′ and 104B′, respectively. The emitters of transistors 102A′ and 102B′ are also connected directly to the external P electrodes of thyratron transistors 106A′ and 106B′, respectively, and through resistors 108A′ and 108B′ to the internal P electrodes of these thyratron transistors. The internal P electrodes of thyratron transistors 106A′ and 106B′ are connected through resistances 110A′ and 110B′, respectively, to negative potential line 112. The external N electrodes of thyratron transistors 106A′ and 106B′ are connected to ground line 30.

The bases of transistors 102A, 102A′, 102B, and 102B′ are connected to the collectors of transistors 114A, 114A′, 114B, and 114B′, respectively. Output lines 116A, 116A′, 116B, and 116B′ from the collectors of transistors 102A, 102A′, 102B and 102B′, respectively, are connected (1) to output terminals 118A, 118A′, 118B, and 118B′, respectively; (2) through diodes 120A, 120A′, 120B, and 120B′ to the bases of transistors 114A, 114A′, 114B, and 114B′, respectively; (3) through diode 122A, 122A′, 122B, and 122B′ to the bases of transistors 114A′, 114B, 114B′, and 114A, respectively; and (4) through resistors 124A, 124A′, 124B, and 124B′, respectively, to ground line 30. The bases of transistors 114A, 114A′, 114B, and 114B′ are connected to ground line 30 through resistors 126A, 126A′, 126B, and 126B′, respectively, while the emitters of these transistors are connected to ground line 30 through resistors 128A, 128A′, 128B, and 128B′, respectively.

P bus 38 is also connected through resistor 130 to the emitter of PNP transistor 132. The emitter of transistor 132 is also connected through resistor 134 to ground line 30 and through resistor 136, to the base of this transistor. The base of transistor 132 is connected to ground through resistor 138. Lines 116A, 116A′, 116B and 116B′ are connected through diodes 140A, 140A′, 140B, and 140B′, to line 142, which line forms the final input to the base of transistor 132. Output line 144 from the collector of transistor 132 is connected to line 116B′. It will be remembered that line 116B′ is connected through diode 122B′ to the base of NPN transistor 114A. As will be seen later, the circuit described in this paragraph is the start circuit for the transistor embodiment shown in FIG. 4.

*Operation of the circuit of FIG. 4*

The signals shown on lines *b* and *c* of FIG. 3 are obtained on O bus 34 and P bus 38, respectively, in a manner previously described. The first pulse on O bus 34 finds all transistors deconditioned and causes no output from the circuit. The first pulse on P bus 38 is applied through resistor 130 to the emitter of transistor 132. Since the base of this transistor is held at a near ground potential by the connection through resistor 138 to ground line 30, this causes the emitter of transistor 132 to become more positive than the base causing this transistor to conduct. Transistor 132 conducting allows a positive potential to be applied through line 144, line 116B′, and diode 122B′ to the base of NPN transistor 114A. Since the emitter of transistor 114A is connected to ground line 30 through resistor 128A, this causes the base of transistor 114A to become more positive than its emitter switching this transistor to its conducting state. Transistor 114A being conducting allows a near ground potential to be applied to the base of transistor 102A. When, 180° later, a signal is applied to O bus 34, the emitter of transistor 102A becomes more positive than its base causing this transistor to conduct. This results in an output signal on line 116A which is applied to external circuitry through terminal 118A. The signal on line 116A is also applied through diode 120A to the base of transistor 114A to maintain this transistor conducting when the signal on line 116B′ from transistor 132 terminates due to the termination of a pulse level on P bus 38; and through diode 122A to the base of transistor 114A′. Finally, the signal on line 116A is applied through diode 140A and line 142 to the base of transistor 132 to switch this transistor to a non-conducting state. This turns off the starting circuit. The outputs from the succeeding stages are applied through line 142 to the base of transistor 132 to maintain the start circuit off as long as the circuit is running.

The base of NPN transistor 114A′ being at a more positive level than its emitter due to the signal on line 116A, this transistor conducts, causing a near ground potential to be applied to the base of transistor 102A′. From the above, it can be seen that the second pulse on P bus 38 causes the emitter of transistor 102A′ to be more positive than its base, causing this transistor to conduct. This results in an output signal on line 116A′ which is applied to external circuitry through terminal 118A′ and is also applied to maintain transistor 114A′ conducting and to cause transistor 114B to be conducting.

Since output line 116B′ from transistor 102B′ is connected through diode 122B′ to the base of transistor 114A, the circuit is capable of operation as a closed ring pulse generator, generating the theoretical output signals shown on lines *g*, *h*, *i* and *j* of FIG. 3.

The fact that transistors are capable of generating an output signal almost immediately after they are energized, allows the circuit to give an output which conforms closely to the theoretical signals shown in FIG. 3. This however, causes a problem which was not encountered with the relay circuits of FIGS. 1 and 2. From FIG. 4, it is seen that whenever there is a signal on line 116B′ and a signal applied to O bus 34, transistor 102A is conducting to generate an output signal on line 116A. This occurs during the desired periods shown on line *g* of FIG. 3, but, it also occurs during the undesired periods indicated by the dotted boxes on this line. With relay circuits, the actual conditioning signal occurs sufficiently after the theoretical signal so that the signal on the bus has decayed sufficiently to prevent the spurious outputs shown on line *g* from occurring. However, with transistor circuits, the elements react quickly enough to cause the spurious output to occur unless some circuitry is provided to suppress it.

Referring to FIGS. 3 and 4 together, it is seen that a desired output occurs when the conditioning signal on line 116B′ is applied to transistor 114A before a signal is applied to O bus 34 whereas the converse is true for the spurious output signals. It is therefore desired to suppress an output signal when a signal appears on the bus feeding a transistor 102 prior to a conditioning signal being applied to the corresponding transistor 114. This suppressing is accomplished by thyratron transistors 106.

Referring to thyratron transistor 106A, it is seen that if transistor 102A is not conducting (there is no conditioning signal applied to line 116B′), there is current flow through resistor 100A, 108A, and 110A to negative potential line 112. This current flowing through resistor 110A causes a potential drop across the resistor which raises the potential at the internal P electrode of thyratron transistor 106A to a positive level. Since the control electrode of this thyratron transistor is connected directly to ground line 30, this causes the thyratron transistor to become conductive. Thyratron transistor 106A being conductive applies a ground potential to the emitter of transistor 102A preventing this transistor from being turned on when a slightly positive potential is applied to its base by the turning on of transistor 114A.

This effectively suppresses the spurious output signals. When the signal on O bus 34 dies, thyratron transistor 106A is extinguished.

If a signal is applied to line 116B' before a signal is applied to O bus 34 transistor 102A is conducting at the time a signal is applied to this bus. Most of the current passing through resistor 100A therefore passes through the low resistance path formed by conducting transistor 102A and very little of it passes through resistors 108A and 110A. The potential drop across resistor 110A is therefore insufficient to bring the internal P electrode of thyratron transistor 106A to a positive potential and this transistor remains extinguished. An output is obtained from the circuit in the manner previously described.

The timing pulses from output terminals 118 of the transistor embodiment of the invention shown in FIG. 4 may be used as conditioning inputs to gates used to perform various functions. While the relay embodiments of the invention shown in FIGS. 1 and 2 are also timing-pulse supplying ring circuits, the third contact (and other additional contacts if desired) on each relay may be used directly to perform gating functions. The relay embodiments are therefore two electronic commutators.

*Alternative embodiments*

Figure 5:
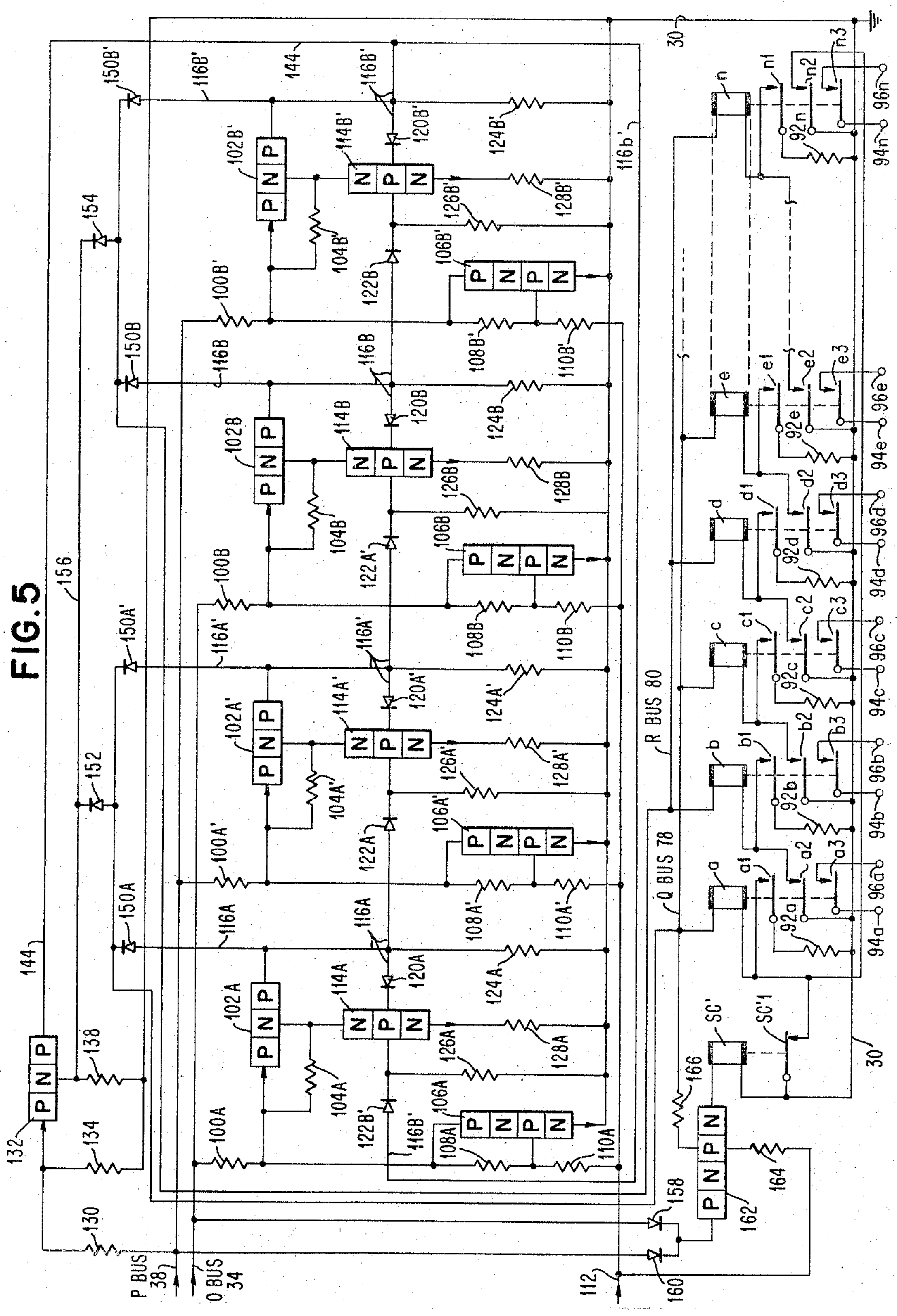
FIG. 5 is a schematic diagram of a hybrid, transistor-relay embodiment of the invention.

In the circuit of FIG. 2, relays A, A', B, and B' are called upon to be energized many times more often than relays *a–n*. It would therefore be anticipated that the life of the former relays would be much less than that of the latter. Since transistors are longer-life elements than relays, it is advantageous to substitute the circuit of FIG. 4 for the four relays A, A', B, and B' shown in FIG. 2. The resulting circuit is shown in FIG. 5. Like components in FIG. 5 have been given the same reference number as those in FIGS. 2 and 4 and may be easily identified.

The new circuitry employed in FIG. 5 is as follows: Lines 116A and 116A' are connected through diodes 150A and 150A', respectively, to Q bus 78. Lines 116B and 116B' are connected through diodes 150B and 150B' to R bus 80. Q bus 78 and R bus 80 are connected through diodes 152 and 154, respectively, and through line 156 to the base of transistor 132. Transistor 132 is therefore deconditioned whenever a signal appears on either Q bus 78 or R bus 80.

O bus 34 and P bus 38 are connected through diodes 158 and 160, respectively, to the external P electrode, to the anode, of thyratron transistor 162. The internal P electrode of thyratron transistor 162 is connected through resistor 164 to negative potential line 112 and through resistor 166 to Q bus 78. The external N electrode, the cathode, of thyratron transistor 162 is connected through start coil SC' to ground line 30. The relative values of resistors 164 and 166 are such that when a signal appears on Q bus 78, the potential at the internal P junction of thyratron transistor 162 becomes more positive than the potential at its emitter and the thyratron transistor becomes conductive. As may be seen from the figure, the remaining elements are the same as, and perform the same functions as, the elements shown in FIGS. 2 and 4.

For the most part, the operation of the circuit shown in FIG. 5 may be easily deduced from the previously described operations of the circuits of FIGS. 2 and 4. One difference is the manner in which signals are obtained on Q bus 78 and R bus 80. In FIG. 5, the outputs from transistors 102A and 102A' on lines 116A and 116A', respectively, are combined to form the signal on Q bus 78. Similarly, the outputs from transistors 102B and 102B' are on lines 116B and 116B' are combined to form the signal on R bus 80. The start circuit for the transistor portion of the circuit of FIG. 5 is deenergized when a signal appears on either Q bus 78 or R bus 80, these signals being applied through line 156 to the base of transistor 132.

The second difference is in the manner in which the start circuit for relay chain *a–n* is controlled. The first signal on Q bus 78 is applied through relay coil *a* and normally-closed contact SC'1 to ground line 30. Once relay coil *a* has been energized, it is desired to open normally-closed contact SC'1. This is accomplished by applying the signal on Q bus 78 through resistor 166 to the internal P electrode of thyratron transistor 162. This causes the internal P electrode of thyratron transistor 162 to become more positive than the emitter of this transistor, causing thyratron transistor 162 to become conductive. This results in a continuous potential level being applied through the thyratron transistor and coil SC' to ground line 30. Contact SC'1 is therefore opened as long as there is a potential on either O bus 34 or P bus 38.

While in the illustrative embodiments described above, relays or transistors have been used as the switching elements, this is in no way a limitation on the invention and any other suitable electronic switching element may be employed.

Further possible modifications of the circuit would include varying the phase difference between the phase $\alpha$ and phase $\beta$ signals or using all three phases of the three-phase A.-C. power supply to obtain different waveshapes than those shown in FIG. 3 on O bus 34 and P bus 38. The only necessary limitation on these waveshapes is that there be sufficient overlap between them to allow the circuit to operate. Where polyphase A.-C. waveforms are used, it may be advantageous to form N trains of waveshapes, where there is overlap between the end of each waveshape in a train and the beginning of the succeeding waveshape in the next train, and there is overlap between the end of a waveshape in the last train and the beginning of the next waveshape in the first train. Each train of waveshapes is applied to a separate bus with the N buses being connected to succeeding ones of the first N switching elements and to each $N^{th}$ switching element after the first it is connected to. For example, if N equals three, there would be overlap between the end of a waveshape on the first bus and the beginning of a waveshape on the second bus, between the end of a waveshape on the second bus and the beginning of a waveshape on the third bus, and between the end of a waveshape on the third bus and the beginning of a waveshape on the first bus. The first bus would be connected to the first, fourth, seventh, etc., switching element; the second bus to the second, fifth, eighth, etc., switching element; and the third bus to the third, sixth, ninth, etc., switching element.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic ring circuit which is synchronized with an A-C waveform comprising:

means for obtaining a first and a second train of waveshapes from said A-C waveform, the duration and relative frequency of said waveshapes being such that each of said second waveshapes begins just before the preceding first waveshape ends and each of said first waveshapes begins just before the preceding second waveshape ends;

a plurality of first switching means;

a plurality of second switching means;

means for applying said first train of waveshapes to each of said first switching means;

means for applying said second train of waveshapes to each of said second switching means;

means for electrically connecting said switching means in a closed ring of alternate first and second switching means;

said connecting means being responsive to a first switching means passing a first waveshape through it for conditioning the succeeding second switching means to pass the next second wavehape;

and being responsive to a second switching means passing a second waveshape through it for conditioning the succeeding first switching means to pass the next first waveshape;

start means for conditioning the first of said first switching means to pass the first waveshape of said first train;

and means for deactivating said start means after said first waveshape passes through the first of said first switching means for maintaining said start means deactivated for the duration of said A-C waveform.

2. An electronic commutator which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

a plurality of first relays each having a coil and a plurality of contacts;

a plurality of second relays each having a coil and a plurality of contacts;

means for applying said first train of waveshapes to each of said first relay coils;

means for applying said second train of waveshapes to each of said second relay coils;

and means for connecting the contacts of said relays in a manner such that when one of said first relay coils is energized, it remains energized through one of its own contacts and the next of said second relay coils is conditioned to be energized through another contact of the energized relay, and once one of said second relay coils is energized, it remains energized through one of its own contacts and the next of the first relay coils is conditioned to be energized through another contact of the energized relay.

3. An electronic commutator which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

a plurality of first relays each having a coil and a plurality of contacts;

a plurality of second relays each having a coil and a plurality of contacts;

a first bus for applying said first train of waveshapes to each of said first relay coils;

a second bus for applying said second train of waveshapes to each of said second relay coils;

means for connecting the contacts of each of said first relays in a manner such that when one of said first relay coils is energized, a circuit path is formed from said first bus through the energized first relay coil and a now-closed first contact of said first relay to a source of potential and a circuit path is formed from said second bus through the next second relay coil and a now-closed second contact of said first relay to said source of potential;

and means for connecting the contacts of each of said second relays in a manner such that when one of said second relay coils is energized, a circuit path is formed from said second bus through the energized second relay coil and a now-closed first contact of said second relay to a source of potential and a circuit path is formed from said first bus through the next first relay coil and a now-closed second contact of said second relay to said source of potential.

4. A circuit of the type described in claim 3 including:

a start relay having a coil and at least one contact;

means for connecting the contact of said start relay in a manner such that when said start coil is deenergized, a circuit path is formed from said first bus through the coil of the first relay of said first plurality of relays to said source of potential;

and means operable after said first relay coil has been energized for maintaining said start relay coil energized for the duration of said A-C waveform.

5. An electronic ring circuit which is synchronized with an A-C waveform comprising:

means for obtaining a first and a second train of waveshapes from said A-C waveform, the duration and relative frequency of said waveshapes being such that each of said second waveshapes begins just before the preceding first waveshape ends and each of said first waveshapes begins just before the preceding second waveshape ends;

a plurality of first transistor switching circuits including:

an output transistor; and a first transistor controlling the conduction state of said output transistor;

a plurality of second transistor switching circuits including:

an output transistor; and a first transistor controlling the conduction state of said output transistor;

means for applying said first train of waveshapes to the said output transistor in each of said first transistor switching circuits;

means for applying said second train of waveshapes to said output transistor in each of said second transistor switching circuits;

means responsive to said output transistor in one of said first transistor switching circuits passing a waveshape of said first train for conditioning said first transistor in the succeeding one of said second transistor switching circuits to condition in turn said output transistor in the same said second transistor switching circuit to pass the next waveshape of said second train; and means responsive to said output transistor in one of said second transistor switching circuits passing a waveshape of said second train for conditioning said first transistor in the succeeding one of said first transistor switching circuits to condition in turn said output transistor in the same said first transistor switching circuit to pass the next waveshape of said first train.

6. An electronic ring circuit which is synchronized with an A-C waveform comprising:

means for obtaining a first and a second train of waveshapes from said A-C waveform, the duration and relative frequency of said waveshapes being such that each of said second waveshapes begins just before the preceding first waveshape ends and each of said first waveshapes begins pust before the preceding second waveshape ends;

a plurality of first transistor switching circuits including a first transistor controlling the conduction state of an output transistor;

a plurality of second transistor switching circuits including a first transistor controlling the conduction state of an output transistor;

a first bus for applying said first train of waveshapes to said output transistor in each of said first transistor switching circuits;

a second bus for applying said second train of waveshapes to said output transistor in each of said second transistor switching circuits;

means responsive to said output transistor in one of said first transistor switching circuits passing a waveshape of said first train for maintaining said first transistor in said first transistor switching circuit conductive for the duration of said waveshape of said first train and for conditioning said first transistor in the succeeding one of said second transistor switching circuits to condition in turn said output transistor in the same said second transistor switching circuit to pass the next waveform of said second train; and means responsive to said output transistor in one of said second transistor switching circuits passing a waveshape of said second train for maintaining said first transistor in said second transistor switching circuit conductive for the duration of said waveform of said second train and for conditioning first transistor in the succeeding one of said first transistor switching circuits to condition in turn said output transistor in the same said first transistor switching circuit to pass the next waveshape of said first train.

7. A circuit of the type described in claim 6, including:

means for preventing one of said transistor switching circuits from becoming conductive if a waveshape is applied to it before a conditioning signal is applied to it.

8. A circuit of the type described in claim 6, including:

a start transistor switching circuit;

means responsive to a waveshape of said second train passing through said start transistor switching circuit for conditioning the first of said first transistor switching circuits to pass the first waveshape of said first train of waveshapes; and means operable after said first transistor switching circuit passes said first waveshape for deenergizing said start transistor switching circuit for the duration of said A-C waveform.

9. An electronic ring circuit which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

means for converting said first and second trains of spaced waveshapes into a third and a fourth train of spaced waveshapes, there being a time overlap between the end of a waveshape in either said third or said fourth train of said waveshapes and the beginning of a waveshape in the other of said trains, and a waveshape in one of said third or fourth trains having a longer duration than a waveshape in one of said first or second trains;

a plurality of first switching means;

a plurality of second switching means;

means for applying said third train of waveshapes to each of said first switching means;

means for applying said fourth train of waveshapes to each of said second switching means;

means responsive to a first switching means passing a waveshape of said third train through it for conditioning the succeeding second switching means to pass the next fourth waveshape; and means responsive to a second switching means passing a fourth waveshape through it for conditioning the succeeding first switching means to pass the next third waveshape.

10. An electronic ring circuit which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

a plurality of first switching means;

means for applying said first train of spaced waveshapes to alternate ones of said first switching means;

means for applying said second train of waveshapes to the remaining ones of said first switching means;

means responsive to one of said first switching means being conductive for conditioning the succeeding one of said first switching means to pass the next waveshape applied to it;

means operable in response to the successive energization of said first switching means for passing said first and second trains of waveshapes to form a third train of spaced waveshapes and a fourth train of spaced waveshapes, there being a time overlap between the end of a waveshape in one of said third or fourth trains and the beginning of a waveshape in the other of said trains, and each waveshape in one of said third or fourth trains having a duration substantially equal to the duration of two waveshapes in either said first or said second train of waveshapes;

a plurality of second switching means;

means for applying said third train of waveshapes to alternate ones of said second switching means;

means for applying said fourth train of waveshapes to the remaining ones of said second switching means;

and means responsive to a waveshape passing through one of said second switching means for conditioning the succeeding one of said second switching means to pass the next waveshape applied to it.

11. An electronic commutator which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

a plurality of first relays, each of said relays having a coil and a plurality of contacts;

means for applying said first train of spaced waveshapes to alternate ones of said first relay coils;

means for applying said second train of waveshapes to the remaining ones of said first relay coils;

means for connecting contacts of said first relays in a manner such that when a waveshape of one train is passing through one of said relay coils, a closed circuit is formed to pass the next waveshape of the other train through the succeeding first relay coil;

means for connecting other contacts of said first relays to selectively pass said first and second trains of spaced waveshapes to form a third train of spaced waveshapes and a fourth train of spaced waveshapes, there being a time overlap between the end of a waveshape in one of said third or fourth trains and the beginning of a waveshape in the other of said trains, and each waveshape in one of said third or fourth trains having a duration substantially equal to the duration of two waveshapes in either said first or said second train of waveshapes;

a plurality of second relays, each of said second relays having a coil and a plurality of contacts;

means for applying said third train of waveshapes to alternate ones of said second relay coils;

means for applying said fourth train of waveshapes to the remaining ones of said second relay coils;

and means for connecting the contacts of said second relays in a manner such that when a waveshape of one of said third or fourth trains is passing through one of said second relay coils, a closed circuit is formed to pass the next waveshape of the other train through the succeeding second relay coil.

12. An electronic commutator which is synchronized with an A-C waveform comprising:

means for converting said A-C waveform into a first train of spaced waveshapes and a second train of spaced waveshapes, there being a time overlap between the end of a waveshape in one of said trains and the beginning of a waveshape in the other of said trains;

a plurality of transistor switching circuits;

means for applying said first train of spaced waveshapes to alternate ones of said transistor switching circuits;

means for applying said second train of waveshapes to the remaining ones of said transistor switching circuits;

means responsive to one of said transistor switching circuits being conductive for conditioning the succeeding one of said transistor switching circuits to pass the next waveshape applied to it;

means for converting the outputs from said transistor switching circuits into a third train of spaced waveshapes and a fourth train of spaced waveshapes, there being a time overlap between the end of a waveshape in one of said third or fourth trains and the beginning of a waveshape in the other of said trains, and each waveshape in one of said third or fourth trains having a duration substantially equal to the duration of two waveshapes in either said first or said second train of waveshapes;

a plurality of relays, each of said relays having a coil and a plurality of contacts;

means for applying said third train of waveshapes to alternate ones of said relay coils;

means for applying said fourth train of waveshapes to the remaining ones of said relay coils;

and means for connecting the contacts of said relays in a manner such that when a waveshape of one of said third or fourth trains is passing through one of said relay coils, a closed circuit is formed to pass the next waveshape of the other train through the succeeding relay coil.

References Cited

UNITED STATES PATENTS

| | | | |
|---|---|---|---|
| 2,226,459 | 12/1940 | Bingley | 328—29 |
| 2,600,729 | 6/1952 | Boyer et al. | 317—140 X |
| 2,852,701 | 9/1958 | Leonard | 317—140 X |
| 3,012,096 | 12/1961 | Steinmetz et al. | |
| 3,047,738 | 7/1962 | Haas | 307—88.5 |
| 3,160,794 | 12/1964 | Gill | 317—140 |
| 3,168,657 | 2/1965 | Welts | 307—88.5 |

ARTHUR GAUSS, *Primary Examiner.*

S. D. MILLER, *Assistant Examiner.*

UNITED STATES PATENT OFFICE

CERTIFICATE OF CORRECTION

Patent No. 3,329,831 July 4, 1967

Paul Abramson et al.

It is hereby certified that error appears in the above numbered patent requiring correction and that the said Letters Patent should read as corrected below.

Column 11, line 12, before "means", first occurrence, insert -- and --; column 12, line 57, for "pust" read -- just --; column 12, line 59, beginning with "a plurality" strike out all to and including "transistor;" in line 64, same column 12, and insert instead the following:

a plurality of first transistor switching circuits including:
an output transistor; and
a first transistor controlling the conduction state of said output transistor;
a plurality of second transistor switching circuits including:
an output transistor; and
a first transistor controlling the conduction state of said output transistor;

Signed and sealed this 18th day of June 1968.

(SEAL)
Attest:

EDWARD M.FLETCHER,JR.
Attesting Officer

EDWARD J. BRENNER
Commissioner of Patents